(12) United States Patent
Hill et al.

(10) Patent No.: US 7,136,472 B2
(45) Date of Patent: *Nov. 14, 2006

(54) SYSTEM AND METHOD FOR PRIVACY MANAGEMENT

(75) Inventors: Nicholas P. Hill, Atlanta, GA (US); Aamir M. Hussain, Marietta, GA (US); Scott C. Holt, Smyrna, GA (US); Anita H. Simpson, Decatur, GA (US)

(73) Assignee: Bellsouth Intellectual Property Corporation, Wilmington, DE (US)

( * ) Notice: Subject to any disclaimer, the term of this patent is extended or adjusted under 35 U.S.C. 154(b) by 25 days.

This patent is subject to a terminal disclaimer.

(21) Appl. No.: 10/917,617

(22) Filed: Aug. 13, 2004

(65) Prior Publication Data

US 2005/0018832 A1    Jan. 27, 2005

(51) Int. Cl.
H04M 3/42 (2006.01)
H04M 1/56 (2006.01)

(52) U.S. Cl. ............................ 379/210.03; 379/207.02; 379/142.02

(58) Field of Classification Search ........... 379/207.02, 379/229, 230, 142.05, 196, 210.02, 210.03, 379/142.02
See application file for complete search history.

(56) References Cited

U.S. PATENT DOCUMENTS

| | | | |
|---|---|---|---|
| 5,533,106 A * | 7/1996 | Blumhardt | 379/142.02 |
| 5,701,301 A | 12/1997 | Weisser, Jr. | |
| 5,757,899 A | 5/1998 | Boulware | |
| 5,809,114 A | 9/1998 | Solomon | |
| 5,838,774 A | 11/1998 | Weisser, Jr. | |
| 5,864,612 A * | 1/1999 | Strauss et al. | 379/142.03 |
| 5,953,399 A * | 9/1999 | Farris et al. | 379/207.15 |
| 6,332,021 B1 * | 12/2001 | Latter et al. | 379/142.01 |
| 6,697,461 B1 * | 2/2004 | Middlesworth et al. | 379/88.24 |

OTHER PUBLICATIONS

Bellcore, "LSSGR: Voiceband Data Transmission Interface Section 6.6 (GR-30-CORE)," PP. v-vii, 2-1-2-5; Issue 2, Dec. 1998.
"Selective Call Acceptance" http://www.paulbunyan.net/telephone/rates/features/selectcallaccept.html.

* cited by examiner

Primary Examiner—Benny Quoc Tieu
(74) Attorney, Agent, or Firm—Walters & Zimmerman; Geoff Sutcliffe; Todd Mitchem

(57) ABSTRACT

A privacy management system is disclosed for when a calling party has a private telephone number. Privacy screening services allow a subscriber to manage and monitor incoming telephone calls, such that unwanted calls are not terminated to the subscriber. When a calling party calls the subscriber to this privacy screening service, the privacy management system manages the call according to whether the calling party number is known and public, known and private, or unknown. If the calling party number is known and public, the call is routed to the subscriber. If, however, the calling party is known and private, an announcement is played to the calling party, asking the calling party for permission to override his or her privacy. If the calling party is unknown, the calling party is asked to record his/her name.

16 Claims, 10 Drawing Sheets

SYSTEM AND METHOD FOR PRIVACY MANAGEMENT

BACKGROUND

The present invention relates to the termination of telephone calls in a telephone network that provides a privacy screening service to its subscribers.

A privacy screening service is a service that allows a subscriber to the privacy screening service to screen incoming calls. The privacy screening service provides information to the called party (in this case, the subscriber to the privacy screening service) that allows the subscriber to make an informed decision as whether or not to answer the call. For example, a subscriber may use the privacy screening service to block all unidentified calls from going through. Private telephone numbers are telephone numbers that block services such as "caller ID" that would otherwise identify the caller to the called party. In telephone systems that offer private numbers and a privacy screening service to its customers, calls from a private number to a subscriber with the privacy screening service cannot be completed automatically, unless the caller authorizes the system to override the privacy of his number.

FIG. 1 is a schematic diagram showing the basic architecture of an Advanced Intelligent Network telephone system. The Advanced Intelligent Network System is described in U.S. Pat. No. 5,701,301 and U.S. Pat. No. 5,838,774, which are hereby incorporated by reference. FIG. 1 shows the caller's telephone 101 which is connected via the calling party's voice line 102a to its Service Switching Point (SSP) 103. SSP 103 is connected via voice trunk 102b to a second SSP (SSP 104). SSP 104 is the SSP that services the called party's telephone 105. In this example, the called party is a subscriber who has subscribed to the privacy screening service. (The called party will also be referred to as the "subscriber" as well as the "called party" herein.) FIG. 1 also shows a Signaling Transfer Point (STP) 106 which services a Service Control Point (SCP) 107 and a third SSP (SSP 108) which services a Service Node (SN) 109. SCP 107 has a database 107a that contains subscriber information.

STP 106 is a signaling hub that routes packets of data over the common channel signaling network. Common channeling signaling networks are data communications networks laid over the system's switching network that carry data and control messages to and from and among the SSPs, STPs, and SCPs in the network. Signaling System 7 (SS7) is the protocol that runs over common channel signaling networks. A common channel signaling network using the Signaling System 7 protocol is often referred to as an SS7 network. The SS7 network carries data and control messages to the SSPs in the telephone network. SCPs are powerful fault-tolerant computers, e.g., AT&T Star Server FT Model 3200 or AT&T Star Server FT Model 3300 computers (these and more current computers such as the Advantage P200 and Advantage 4P200 models are presently available from Lucent Technologies). SCPs are "intelligence centers" with access to applications databases that enable the network to deliver advanced services such as caller ID, privacy screening and call forwarding. The SCPs also execute service package applications (SPAS) that deliver the advanced services. SNs are physically generally similar to SCPs, but include voice and Dual Tone Multi-Frequency (DTMF) signal recognition circuits, voice synthesizers, and voice recognition and digit collection capabilities. The operators of the telephone network can program their SNs to manage data, to respond to calls and to route calls as specified by the telephone network, and to collect digits from a caller or subscriber. The SN's voice circuits can also be programmed to provide a voice response (e.g., to play pre-selected announcements) to callers and to perform voice recognition. SNs can also be programmed to respond to input from the callers by, e.g., further routing the call.

As shown in FIG. 1, STP 106 controls communications between SSPs 103, 104 and 108 and SCP 107. The SSPs are connected to the caller's and the subscriber's telephones and to each other via voice lines 102a and 102c and via voice trunks 102b and 102d. The SSPs communicate with STP 106 and SCP 107 via SS7 data links 110a, 110b, 110c and 110d. SN 109 is connected to SSP 108 by an Integrated Service Digital Network (ISDN) Basic Rate Interface (BRI) line 111.

When the caller places a call to the subscriber, the call is routed by SSP 103 to SSP 104. FIG. 1a shows a prior art system in which call 1 is routed from the caller to SSP 103 and then to SSP 104. Because the subscriber has subscribed to the privacy screening service, that call (like all calls to that subscriber's number) triggers a "termination attempt trigger" or TAT. In response to the TAT, SSP 104 issues query 2, shown in FIG. 1a. Query 2 is a message that goes up to SCP 107 via STP 106 asking for directions as to how the call should be terminated. The query includes the following information: the subscriber's telephone number (in the called party field), the calling party's telephone number (in the calling party field), the calling party's presentation restriction indicator (also in the calling party field), and, optionally, the trigger criteria type (indicating the service for which the query is intended).

SCP 107 checks the presentation indicator in the calling party field of the query received as a result of the termination attempt trigger. If presentation of the caller's number is not restricted, i.e., if the caller's number is public, SCP 107 sends back a response (response 3 in FIG. 1a) instructing SSP 104 to terminate the call, and to supply the caller's telephone number (and, if the subscriber has subscribed to a higher level of service such as caller ID deluxe, the caller's name and telephone number). In that case, SSP 104 terminates the call (call 1' in FIG. 1a), i.e., completes the call, supplying the subscriber with the caller's number (and possibly also with the caller's name). If the caller's name is to be supplied to the customer, SSP 104 launches another query, a TR1188 CNAM query to the SCP, to obtain the caller's name from either database 107a or another database on the system that contains the names corresponding to the telephone numbers.

The prior art system of FIG. 1a asks the calling party to record his or her name whenever the calling party number is private or unknown. In this prior art system, if the caller's number is private or unknown, SCP 107 enters the subscriber's number in the calling party field in response 3 and directs SSP 104 to forward the call to SN 109 (call 1" in FIG. 1a). When SN 109 answers the call, it asks the calling party to record his or her name. If the calling party responds by recording his or her name, SN 109 then calls the subscriber (call 4 in FIG. 1a), using the subscriber's telephone number (that had been stored in the calling party field).

The TAT provisioned on the subscriber's line at SSP 104 triggers a second time, sending a query (query 5) up to SCP 107 through STP 106. SCP 107 recognizes that this call originated with a service node, SN 109, and sends a response (response 6 in FIG. 1a) authorizing termination to the subscriber. SN 109 then plays a dialog to the subscriber, identifying the calling party by playing the calling party's recorded name for the subscriber. If the subscriber chooses to accept the call, the call is put through (leg 4' of call 4 in FIG. 1a). If the subscriber refuses to accept the call, the calling party is informed that his or her call was not accepted, and the call is disconnected.

This prior art system works irrespective of whether the calling party number is public (i.e., not private), private or unknown, but cannot take full advantage of the advanced intelligent network capabilities of the AIN system, because the calling party number is not preserved. Thus this prior art system does not allow the use of advanced intelligent network features such as call return or call trace.

SUMMARY

The present invention is a system and method that allows calls to be terminated to a subscriber to a privacy screening service, even when the calling party is either private or unknown, and preserves the calling party number when the calling party number is known (whether the calling party number is public or private). The present invention is illustrated in FIGS. 2–3, which show the same basic AIN architecture as the network architecture of prior art systems of FIGS. 1–1a. FIG. 2 shows the operation of the present invention when the calling party is known (for both the case when the calling party number is private and the case when the calling party number is public). FIG. 3 shows the operation of the invention when the calling party number is unknown.

As shown in FIG. 2, when the calling party dials the subscriber's number, the call is routed (as call 1 in FIG. 2) through the caller's SSP (SSP 103), to the subscriber's SSP, SSP 104. The call hits the subscriber's TAT at SSP 104, triggering a query (query 2) in FIG. 2, which goes up to SCP 107 via STP 106, over SS7 links 110b and 110d (links 110b and 110d are identified in FIG. 1, but are not identified in FIGS. 2–3).

SCP 107 checks the calling party ID and presentation indicator in query 2, and determines whether the calling party is known and public, known and private, or unknown. In the present invention, if the calling party number is public and known, SCP 107 sends back a response authorizing termination to the subscriber (response 3 in FIG. 2). If the subscriber has subscribed to a service that provides the calling party's name as well as the calling party's telephone number, SSP 104 then launches a query (e.g., a TR-1188 query) to obtain calling name information from SCP 107 and its database 107a. Then SSP 104 terminates the call to the subscriber (call 1' in FIG. 2), presenting the subscriber with the calling party's number (and name, if the subscriber has subscribed to a service that provides the calling party's name as well as the calling party's number).

If the calling party number is private, SCP 107 re-writes the presentation indicator as "public", i.e., redefines the presentation indicator in the presentation indicator field (i.e., the presentation_restricted_indicator portion of the calling party ID field in the query) as public. As shown in FIG. 2, SCP 107 responds to the TAT query from SSP 104 by directing SSP 104 to forward the call to SN 109, with the presentation indicator re-written as public. SSP 104 writes the subscriber's number in the "re-directing party" field, and forwards the call (call 1" from SSP 104 to SN 109 in FIG. 2) to SN 109 at SN 109's number via SSP 108. Thus, when the call is presented to SN 109, the call has the subscriber's number in the "re-directing party" field, and the original calling party's number in the "calling party" field. Because SCP 107 has toggled the presentation indicator from "private" to "public", SN 109 has access to the calling party number. SN 109 answers the call, and plays an announcement to the calling party, asking for his/her permission to present his/her number (and name) to the subscriber. If the calling party refuses to grant permission to present his/her number (and name) to the subscriber, the call is disconnected. If the calling party agrees to have his/her number (and name) presented, SN 109 dials a Customized Dialing Plan (CDP) code Y (e.g., *95), the 10-digit called party number, and the 10-digit calling party number (call 4 in FIG. 2).

The CDP code Y triggers a query at SSP 108, which launches an info_analyzed query to SCP 107 (query 4' in FIG. 2), populating the "Access Code" and "Collected Digits" fields as follows:

Access Code=Y

Collected Digits=The remainder of the dialed digits, i.e., the 10-digit called party number followed by the 10-digit calling party number.

SCP 107 analyzes the dialed string and returns an analyze_route response (response 5) with:

CdPN=Subscriber's number

CgPN=Calling party number

SSP 108 then dials the subscriber number (call 6 in FIG. 2). This call is routed through SSP 104, where it triggers a TAT query (query 7) from SSP 104 to SCP 107 with the following parameters:

CgPN=Calling party number

CdPN=Subscriber's number

Charge Number=SN 109's number, e.g., lead number for SN 109's Multi Line Hunt Group (MLHG) number SCP 107 recognizes the Charge Number as SN 109's MLHG number, and authorizes SSP 104 to terminate the call (response 8). SSP 104 then presents the call to the subscriber (call 1' in FIG. 2, with the presentation indicator set to "public"). SSP 104 obtains the calling party's name by sending a CNAM TR-1188 query to SCP 107 (or to another SCP that responds to TR-1188 CNAM queries). As soon as the subscriber's telephone rings, SN 109 can drop out of the route, with the call routed through SSPs 103, 104, 108 and 104 (again) and on to the subscriber.

FIG. 3 shows the operation of the present invention when the calling party is unknown. As above, the sequence starts when the calling party dials the subscriber's number. The call is routed (as call 1 in FIG. 3) through the caller's SSP, SSP 103, to the subscriber's SSP, SSP 104. The call hits the subscriber's TAT at SSP 104, triggering a query (query 2 in FIG. 3), which goes up to SCP 107 via STP 106, over SS7 links 10b and 10d. SCP 107 examines the presentation indicator in the calling party ID field in query 2, and determines that the calling party number is unknown.

In response 3 to query 2, SCP 107 then directs SSP 104 to route the call to SN 109 (call 1' from SSP 104 to SN 109 in FIG. 3). The call arrives at SN 109 with the subscriber as the redirecting party, the calling party number in the calling party field, and the SN number in the called party field. When the call is presented to SN 109, SN 109 checks the calling party number, and determines that it is unknown. SN 109 then plays an announcement to the calling party, asking the calling party to record his or her name. If the calling party refuses to do so, the call is disconnected. If the calling party agrees to record his/her name, SN 109 dials the CDP code Y, the 10-digit called party number, and the 10-digit SN Multi Line Hunt Group number (call 4 in FIG. 3). The CDP code Y triggers a query at SSP 108, which sends an info_analyzed query (query 4' in FIG. 3) to SCP 107, populating the "Access Code" and "Collected Digits" fields as follows:

Access Code=Y
Collected Digits=the remainder of the dialed digits, i.e., the 10 digit called party number and the 10-digit SN MLHG number.

SCP 107 analyzes the query and returns an analyze_route message (response 5) to SSP 108, which then calls the subscriber (call 6) with:
CdPN=subscriber's number
CgPN=SN's MLHG number.

This call triggers a TAT query (query 7) on the subscriber's line at SSP 104. The query includes SN 109's MLHG number as the calling party number, the subscriber's number as the called party number, and SN 109's MLHG number as the charge number. Since the charge number is the lead number for SN 109's MLHG, SCP 107 sends SSP 104 an Authorize Termination message (response 8), authorizing termination of the call from SSP 104 to the subscriber. SSP 104 then executes a TRI 188 query, which returns the privacy manager as the calling party name. SSP 104 then completes the call (call 1"). For subscribers to caller ID deluxe, the LCD display on the subscriber's telephone will show, e.g., "Privacy Manager" as the calling party.

SN 109 then plays an announcement to the subscriber, asking the subscriber whether he or she would like to accept or reject a call from the calling party, whose name is played for the subscriber as "recorded name." The subscriber can then, e.g., accept the call by pressing 1, have a simple rejection played by pressing 2, have a "sales call" rejection ("we do not accept sales calls, please remove this number from your caller list") played by pressing 3, or route the call to voicemail by pressing 4. If the subscriber accepts the call, SN 109 transfers control of the call to SSP 104, and drops out (although the call is still routed through SSP 108). If the subscriber rejects the call, SN 109 plays the announcement selected by the subscriber or routes the call to voicemail, and then the call is disconnected.

The present invention thus preserves the calling party number, such that the system can take full advantage of the capabilities of the advanced intelligent network, e.g., call return or call trace for all known calls, whether private or public.

It is an object of the present invention to offer a privacy screening service to subscribers that allows private calling parties to override their privacy, and that allows calls from unknown calling parties to be routed to the subscriber, and yet still allows the use of advanced intelligent network features.

DETAILED DESCRIPTION

Figure 4:
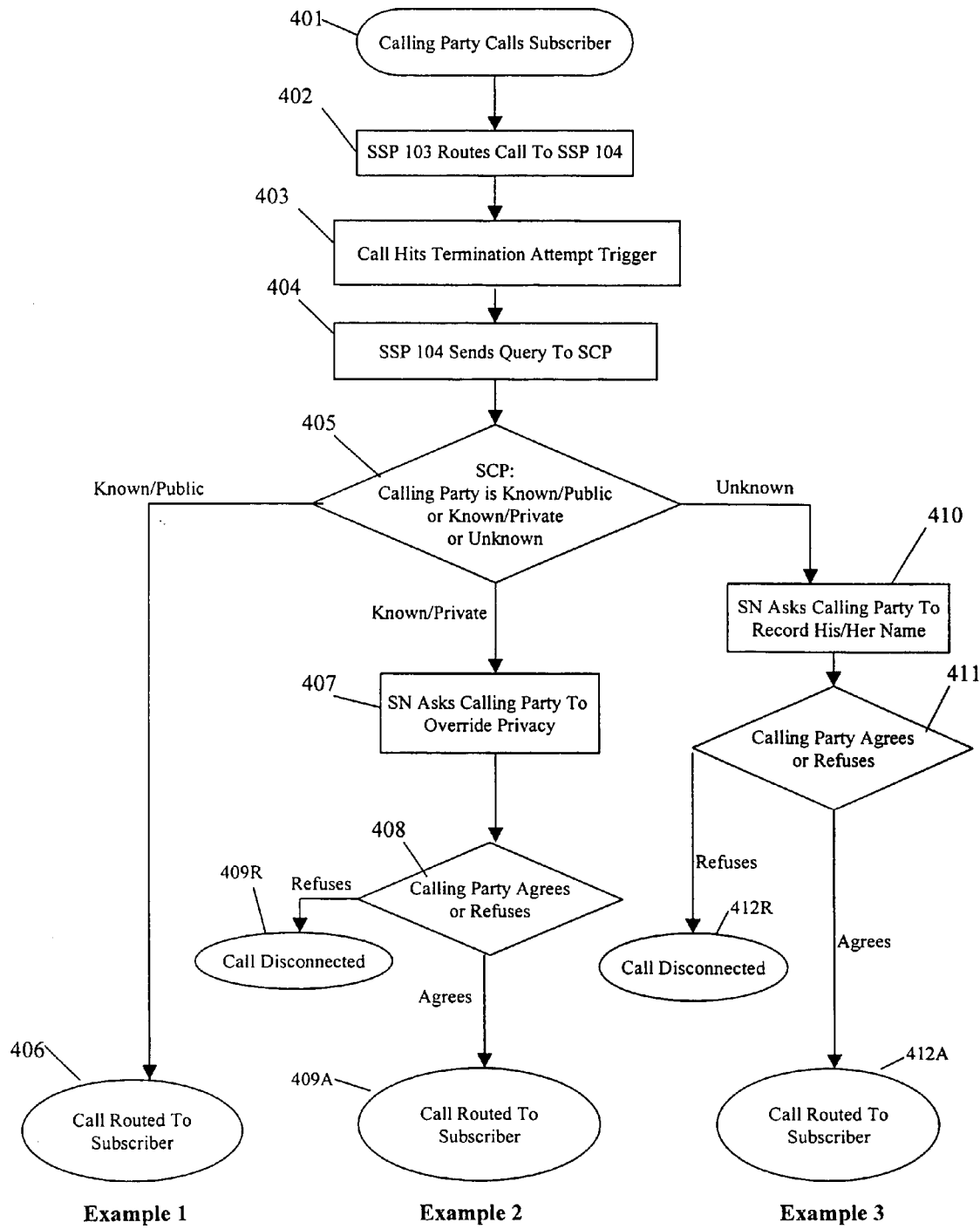
FIG. 4 is an overall schematic diagram of the call flows of the present invention, showing how the call flows depend upon whether the calling party number is public, private or unknown.

The present invention can be described by describing the sequence of call flows initiated when a calling party calls a subscriber who has subscribed to a privacy screening service. FIG. 4 is an overall schematic showing that the call flows depend on whether the calling party number is known and public (further described in Example 1 and FIG. 5), known and private (further described in Example 2 and FIGS. 6–6a) or unknown (further described in Example 3 and FIGS. 7–7a). As shown in FIG. 4, the call sequence starts in step 401, when the calling party dials the subscriber's telephone number. The calling party's SSP, SSP 103, routes the call to the subscriber's SSP, SSP 104 in step 402. Because the subscriber has subscribed to a privacy screening service, in step 403 that call hits a termination attempt trigger or TAT at SSP 104. In response to the TAT, SSP 104 sends a query up to SCP 107 in step 404. In step 405, SCP 107 determines whether (1) the calling party number is known and public, in which case the call is routed to the subscriber in step 406, as described in Example 1 and FIG. 5; (2) the calling party number is known and private, in which case the call is routed to SN 109, which asks the calling party to override his or her privacy (step 407), the calling party agrees or refuses (step 408) and then SN 109 routes the call to the subscriber if the calling party agrees (step 409A) or disconnects the call if the calling party refuses (step 409R), as described in Example 2 and FIGS. 6–6a; or (3) the calling party number is unknown, in which case the call is also routed to SN 109, SN 109 asks the calling party to record his or her name in step 410, the calling party refuses or agrees to record his or her name in step 411, and then the call is disconnected (step 412R) or routed to the subscriber (step 412A). This sequence for unknown calling parties is described in Example 3 and FIGS. 7–7a.

As discussed above, FIGS. 5–7a represent schematically the call flows corresponding to the cases described below in Examples 1–3. The acronyms used in FIGS. 5–7a are:

| | |
|---|---|
| Calling Party Number: | CgPN |
| Called Party Number: | CdPN |
| Charge Number: | ChargeN |
| Re-Directing Party ID: | Re-DirectID |
| Presentation indicator: | Privacy |
| Display Text: | DspTxt |
| Announcement Identification: | AnnID |
| Collect Digits: | CollDig |

The announcements played by the network will be exemplified as follows:

91: Announcement to an unknown calling party, asking the calling party to record his/her name.

92: Announcement to the subscriber, playing the calling party's name, and asking the subscriber to accept or reject the call.

93: Announcement to the calling party when the calling party's number is private, asking the calling party for permission to provide his/her number (and name) to the subscriber, and explaining that if permission is not granted, the call will be disconnected.

For the purpose of illustrating the invention with specific examples, the flow charts in FIGS. 5–7a will all have the calling party number (CgPN) as 111-111-1111, the subscriber's number (initially, CdPN) as 222-222-2222, and the Service Node's Multi-Line Hunt Group number as 333-333-3333.

The specific sequence of calls depends on the private/public/unknown status of the calling party. As described in Examples 1–3, there are three possible call sequences.

EXAMPLE 1

Calling Party is Known and Public

Figure 1:
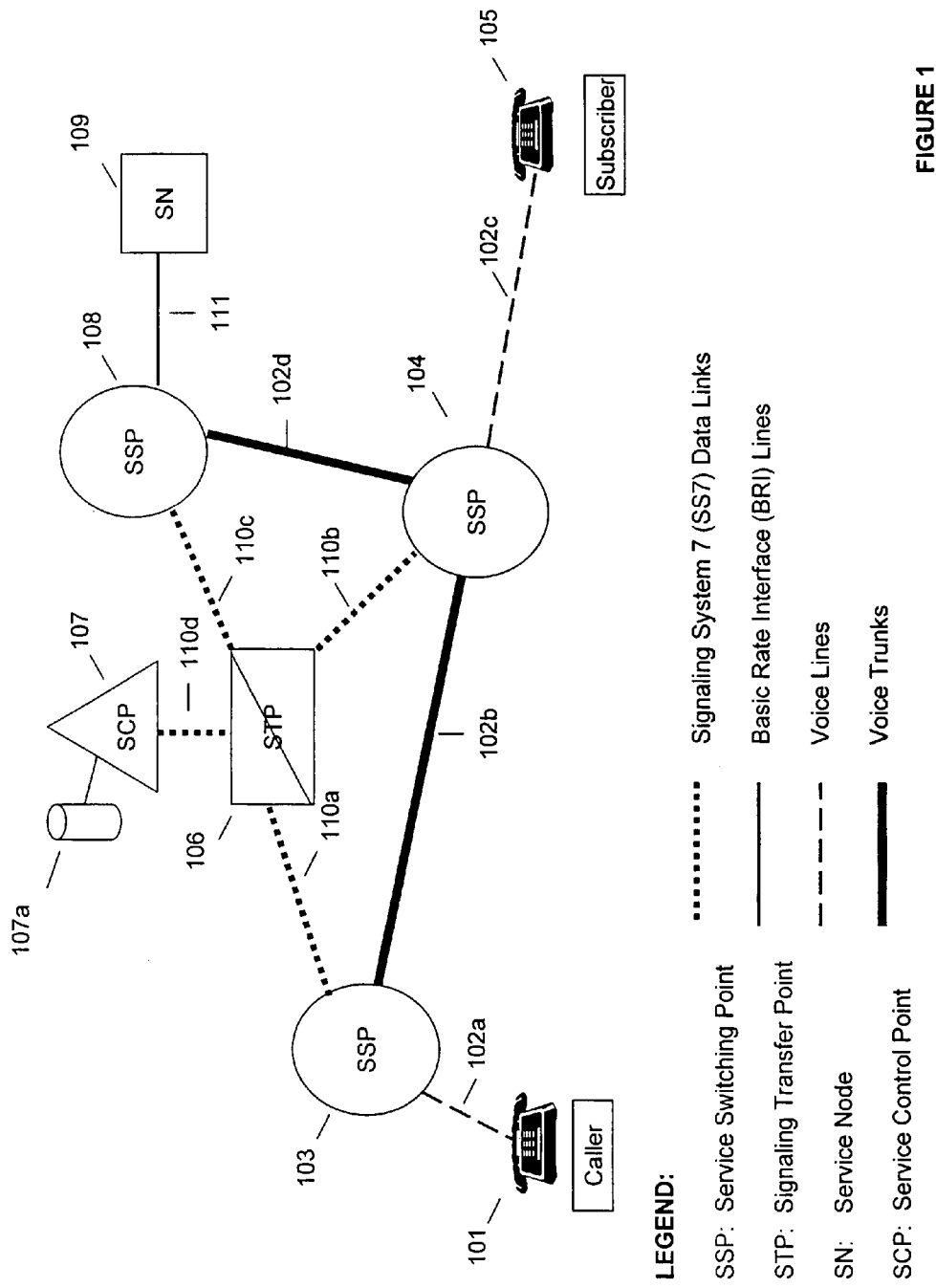
FIG. 1 is a schematic diagram showing the basic architecture of an AIN telephone network.
Figure 1A:
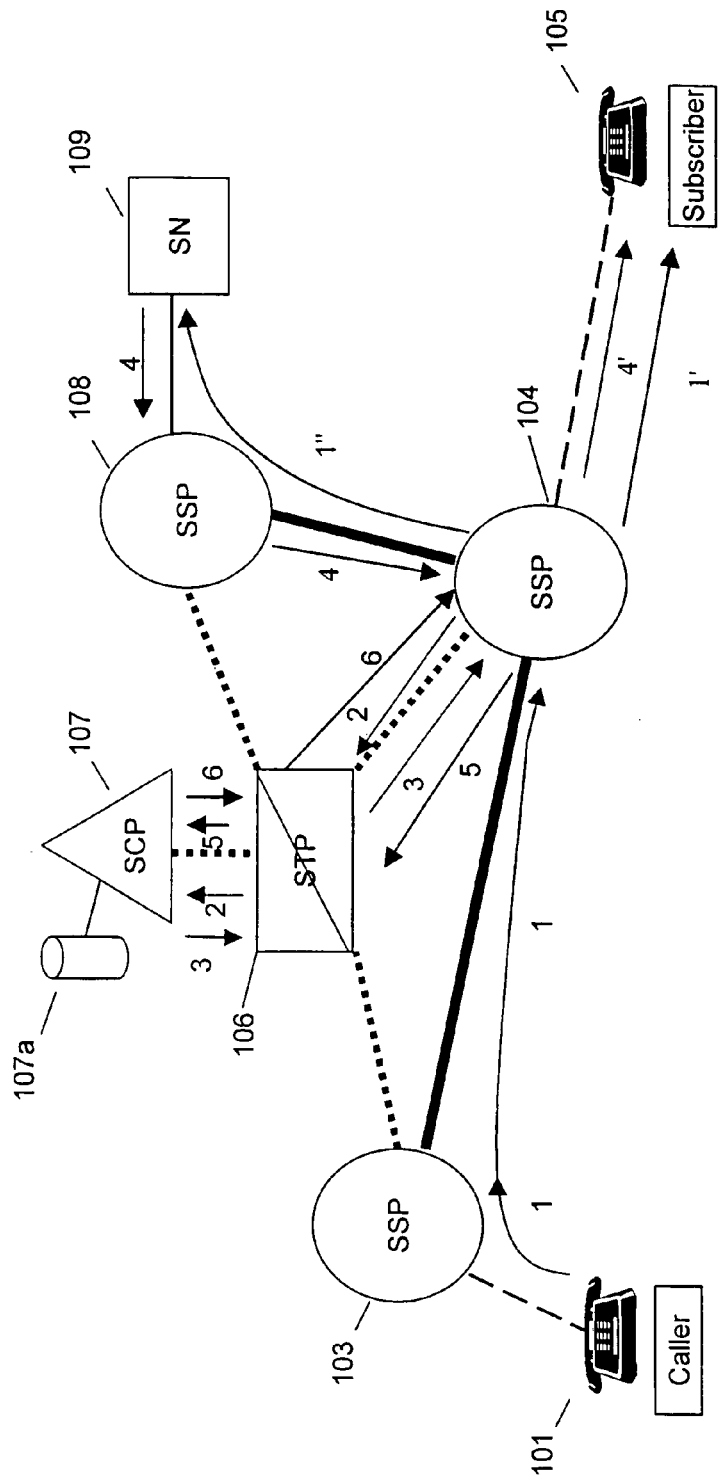
FIG. 1a is a schematic diagram showing a prior art system's routing of calls when a subscriber has subscribed to a privacy screening service.
Figure 2:
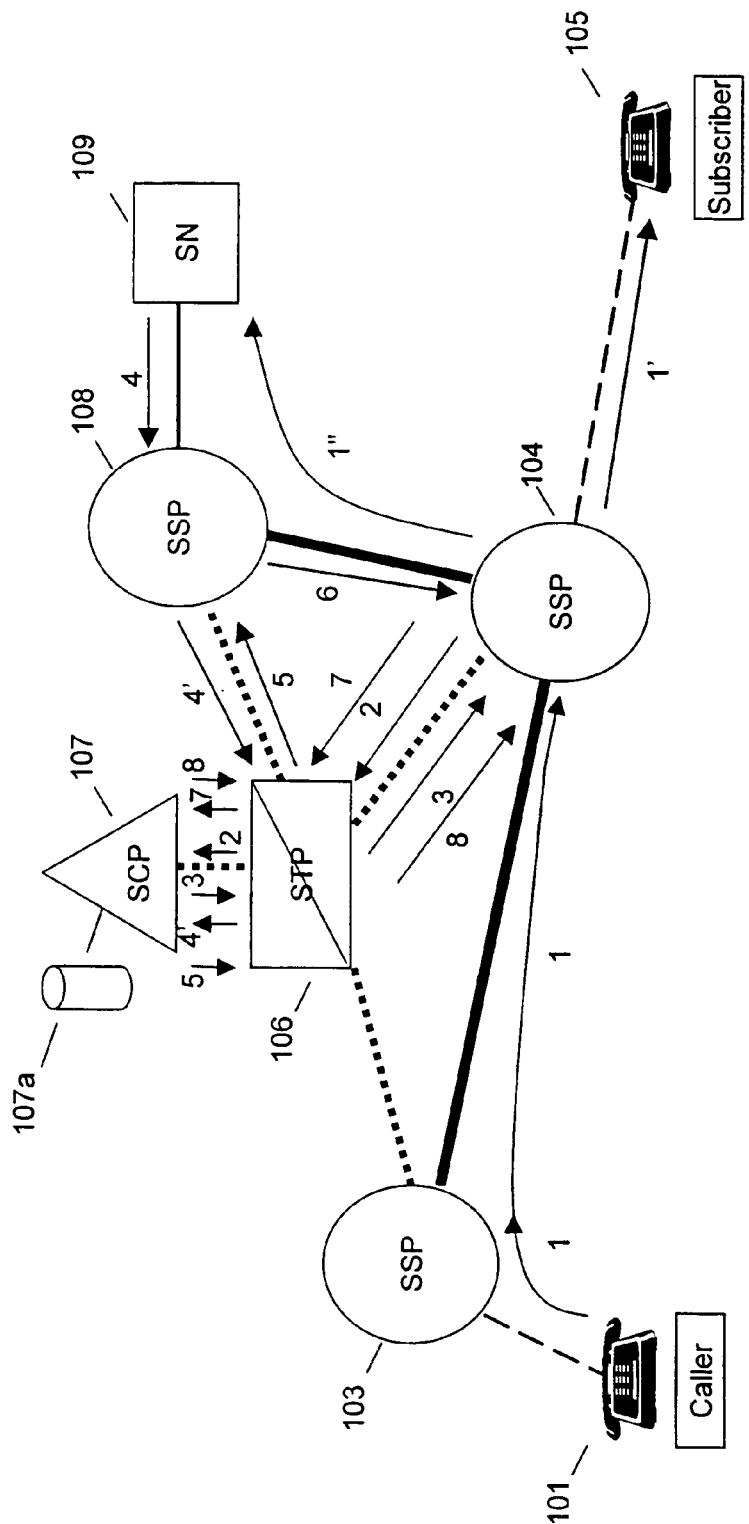
FIG. 2 is a schematic diagram of the present invention, showing the routing of calls when a subscriber has subscribed to a privacy screening service and the calling party number is known.
Figure 5:
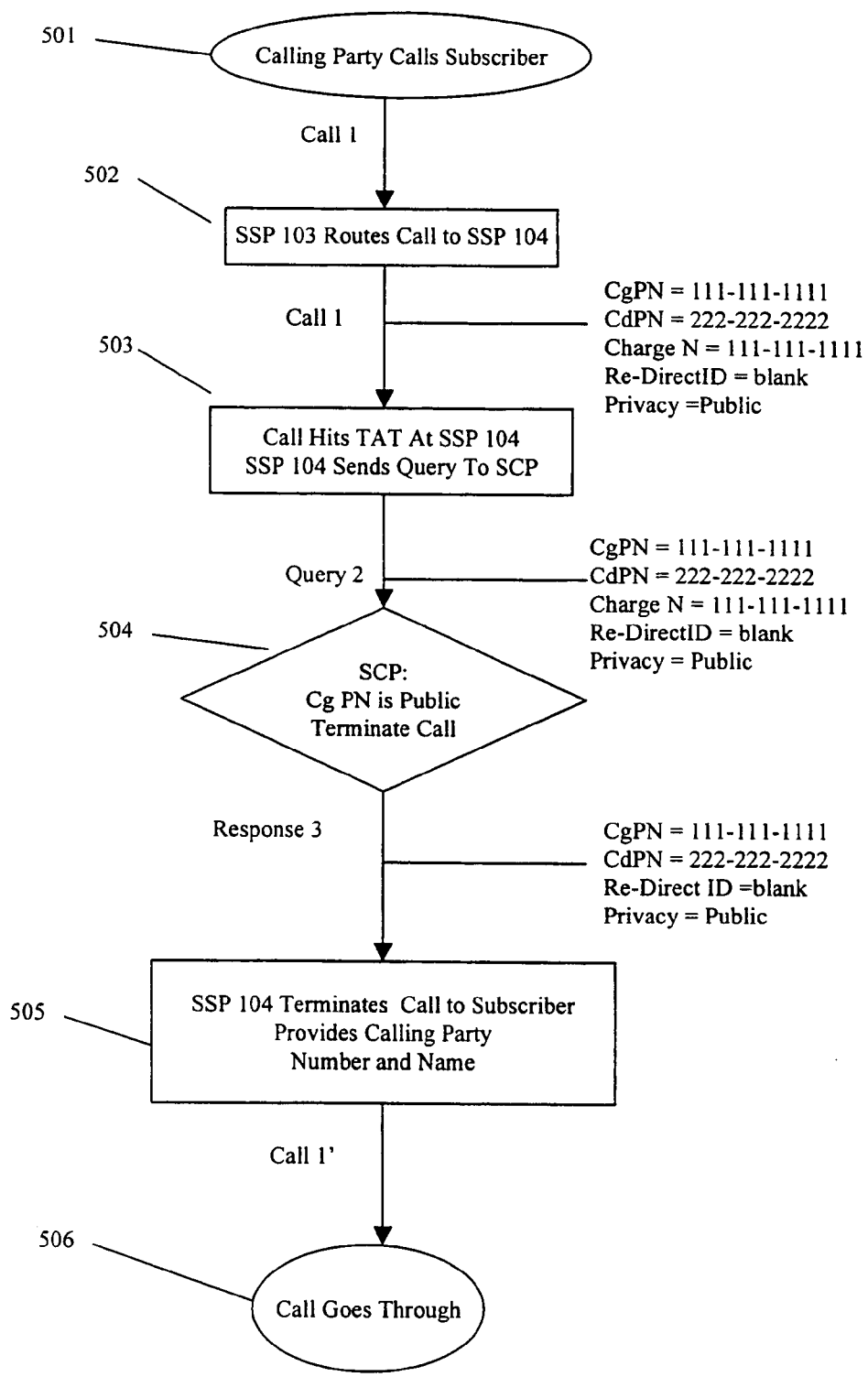
FIG. 5 is a chart outlining the call flows of the present invention, when the subscriber has subscribed to a privacy screening service, and the calling party's number is known and public.

FIG. 5 is a chart showing the call flows to a subscriber when the subscriber has subscribed to a privacy screening service, and the calling party is known (i.e., it is in the system's database) and is public (i.e., there are no restrictions on disclosing the name and number to a called party that has, e.g., caller ID). The sequence is also illustrated in FIG. 2 (call 1, query 2, response 3, call 1').

As shown in FIG. 5, the call flows start in step 501, with the calling party dialing the subscriber's telephone number. That call (call 1 in FIG. 2) goes through the calling party's SSP (SSP 103), carrying with it the calling party's number 111-111-1111 in the CgPN field, the subscriber's or called party number 222-222-2222 in the CdPN field, the calling party's number in the charge number field, and leaving the ReDirectID field blank. The presentation indicator is set to public. In step 502, SSP 103 routes the call to the subscriber's SSP (SSP 104). When the call reaches SSP 104, it hits a termination attempt trigger (or TAT) that has been provisioned on the subscriber's line at SSP 104, to provide the subscriber with the privacy screening service. Thus in step 503, SSP 104 sends a TAT query (query 2 in FIG. 2) to SCP 107. In step 504, SCP 107 checks the presentation indicator in the Calling Party ID and determines that the calling party information is not restricted, i.e., is public, and authorizes termination of the call (response 3).

In step 505, SSP 104 terminates the call to the subscriber, providing the subscriber with the calling party's number (and name if the subscriber's service provides name as well as number). In step 506, the call goes through (call 1' in FIG. 2).

EXAMPLE 2

Calling Party is Known and Private

Figure 6:
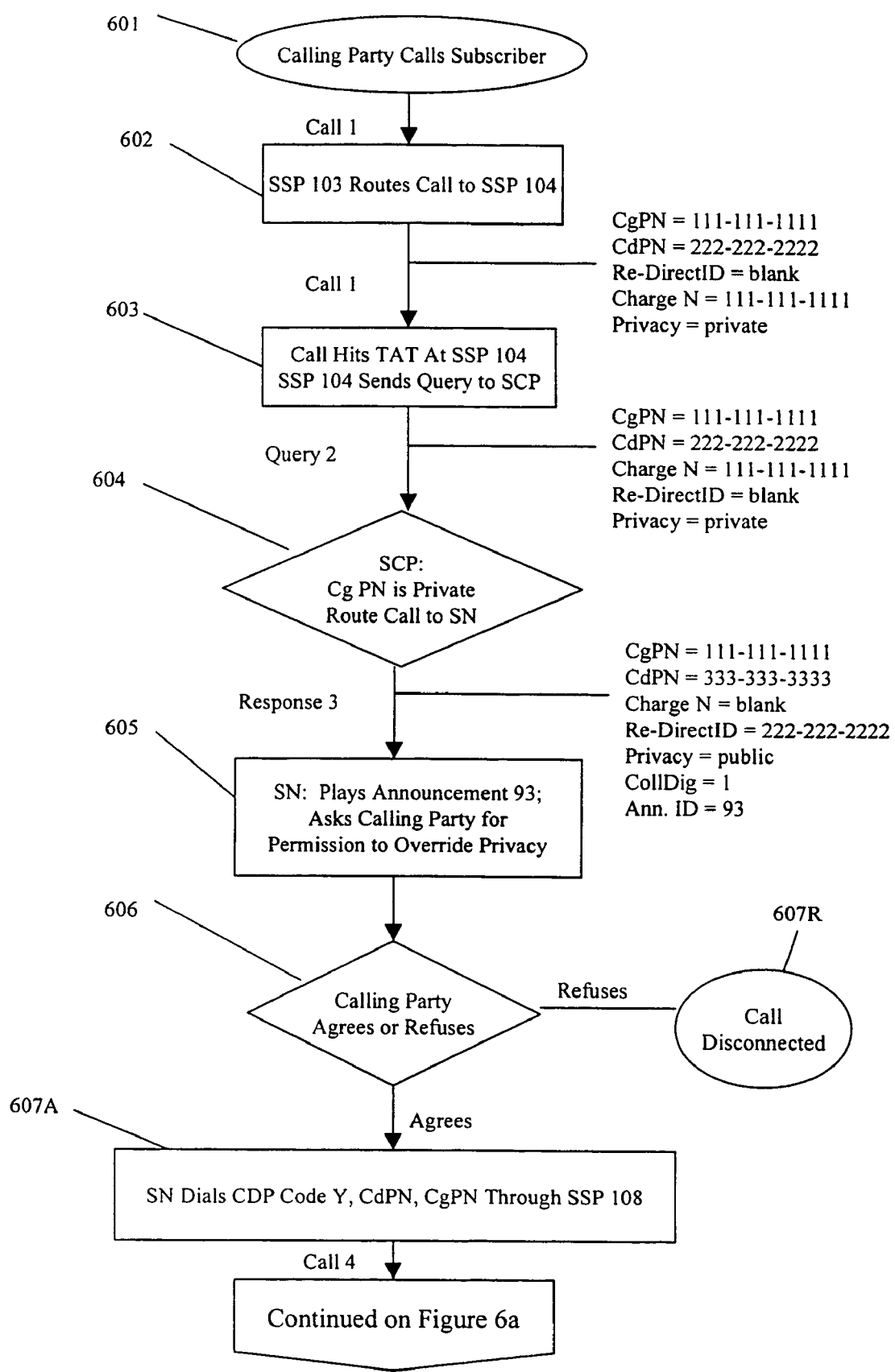
FIGS. 6–6a are charts outlining the call flows of the present invention, when the subscriber has subscribed to a privacy screening service that provides the name and the number of the calling party, and the calling party's number is known and private.
Figure 6A:
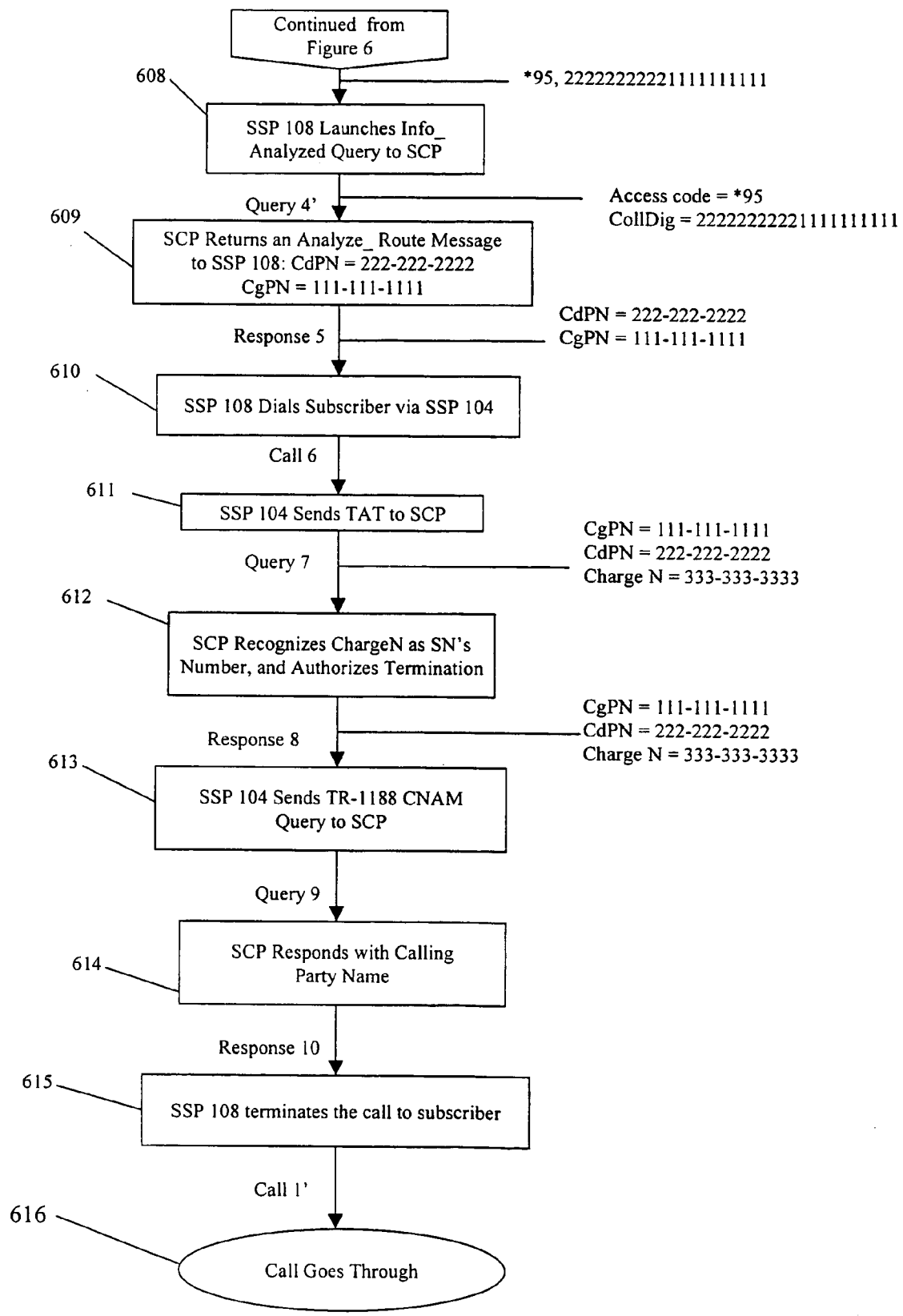

FIGS. 6–6a are charts showing the call flows to a subscriber to a privacy screening service, when the calling party is known, but his/her number is private. In step 601, the calling party starts the call sequence by dialing the subscriber's number. The call goes to the calling party's SSP (SSP 103), which routes the call in step 602 to the subscriber's SSP (SSP 104). Because the subscriber's line at SSP 104 is provisioned with a TAT, this call triggers a TAT query (query 2) from SSP 104 to SCP 107 in step 603. In step 604, SCP 107 checks the presentation indicator in the calling party ID field and determines that the calling party's number is private. SCP 107 then toggles the calling party's presentation indicator from "private" to "public", and instructs SSP 104 to send the call to SN 109, with instructions to SN 109 to play an announcement to the calling party, and collect one digit in response.

In step 605, SN 109 plays an announcement (e.g., announcement 93) asking the calling party to agree to have his or her number (and name) disclosed to the subscriber. In step 606, the calling party can respond by, e.g., pressing "1" to agree or "2" to refuse, and SN 109 collects the digit pressed (e.g., the 1 or the 2). If the calling party refuses permission, in step 607R SN 109 responds by disconnecting the call. In that case, the subscriber never knows that an attempt was made to call him or her.

If the calling party agrees to have his or her privacy overriden, in step 607A SN 109 dials a CDP code Y, the 10-digit called party number and the 10-digit calling party number (call 4 in FIG. 2). In step 608, SSP 108 responds to the CDP code by sending an info_analyzed query (query 4') to SCP 107, populating the "Access Code" and "Collected Digits" fields as follows:

Access code=Y (*95, in this example)

Collected Digits=the remainder of the digits, i.e. the 10-digit called party number followed by the 10-digit calling party number.

In step 609, SCP 107 responds with an analyze_route message (response 5) to SSP 108, with the subscriber's number in the CDPN field, and the calling party number in the CgPN field. SN 109 then dials the subscriber's number in step 610 (call 6). When this call reaches SSP 104, it triggers a TAT, since the subscriber's line is provisioned with the TAT for the privacy screening service. In step 611, SSP 104 sends the TAT query to SCP 107 (query 7), with the calling party's number in the CgPN field, the subscriber's number in the CdPN field, and SN 109's number in the ChargeN field. In step 612, SCP 107 recognizes the charge number as SN 109's number, and authorizes termination of the call to the subscriber (response 8). In step 613, if the subscriber has caller ID Deluxe, SSP 104 sends a TR-1188 CNAM query (query 9, shown only in FIG. 6a) to SCP 107, which responds in step 614 with the calling party's name (response 10, shown only in FIG. 6a). SSP 108 terminates the call to the subscriber in step 615, and the call goes through in step 616 (call 1' in FIG. 2).

EXAMPLE 3

Calling Party is Unknown

Figure 3:
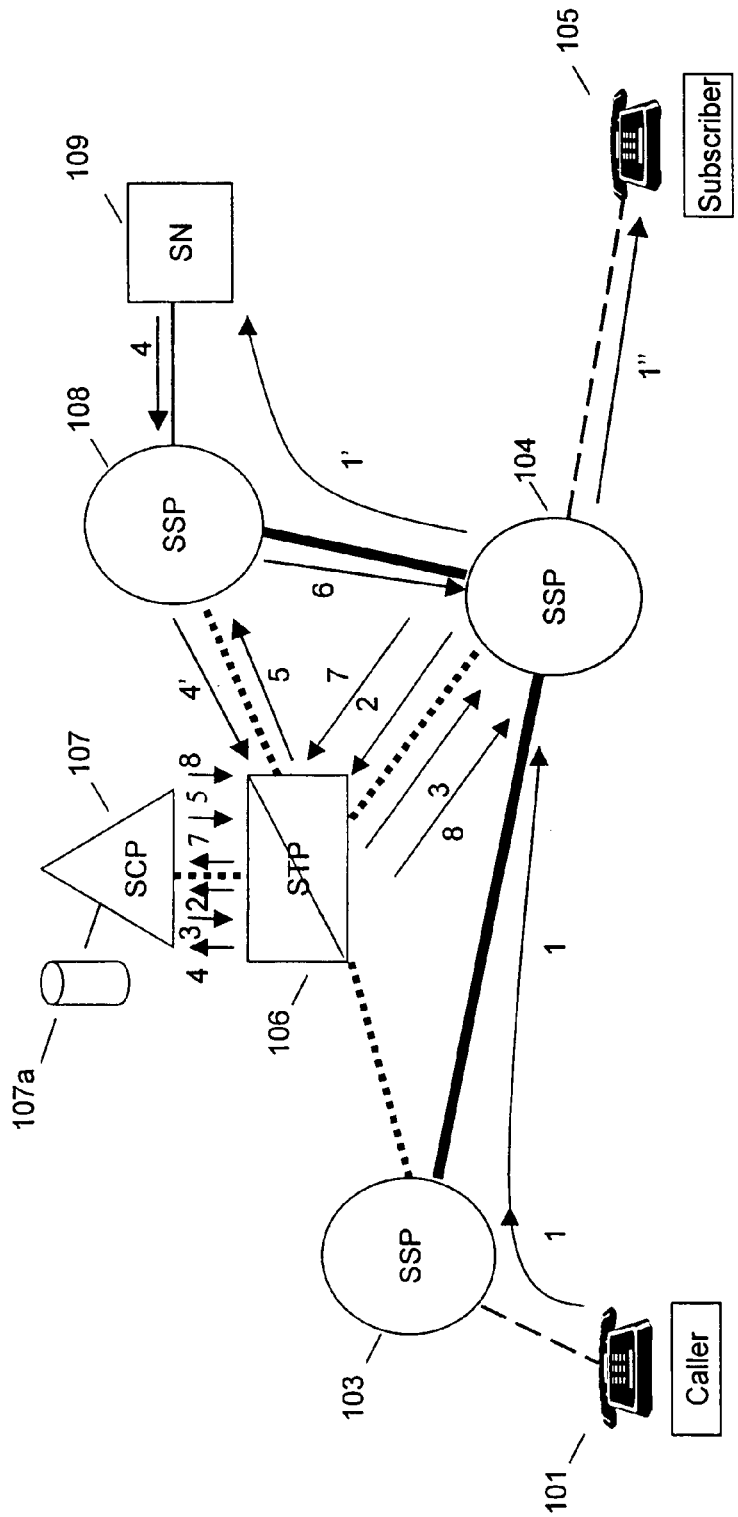
FIG. 3 is a schematic diagram of the present invention, showing the routing of calls when a subscriber has subscribed to a privacy screening service and the calling party number is unknown.
Figure 7:
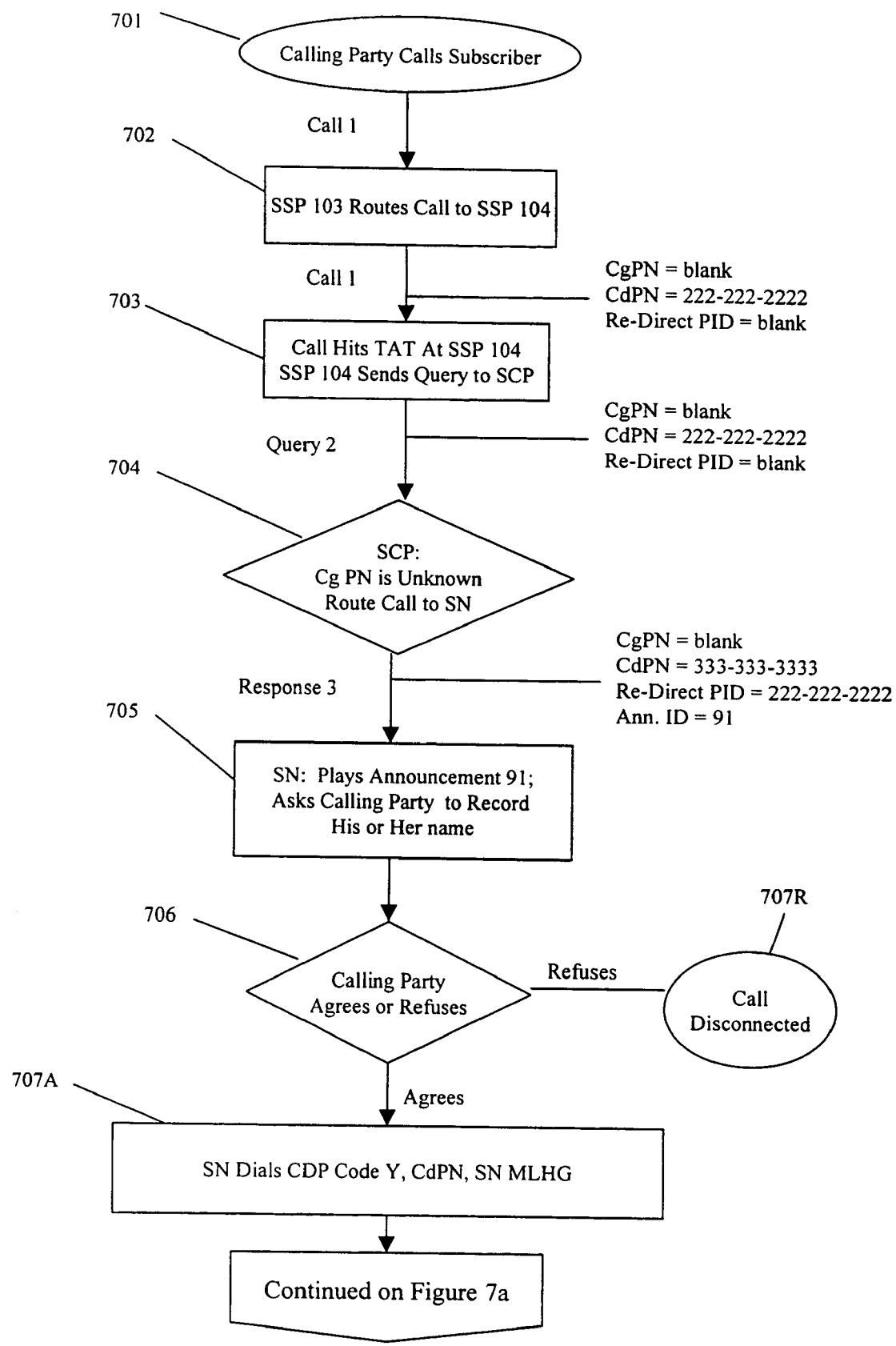
FIGS. 7–7a are charts outlining the call flows of the present invention, when the subscriber has subscribed to a privacy screening service, and the calling party's number is unknown.
Figure 7A:
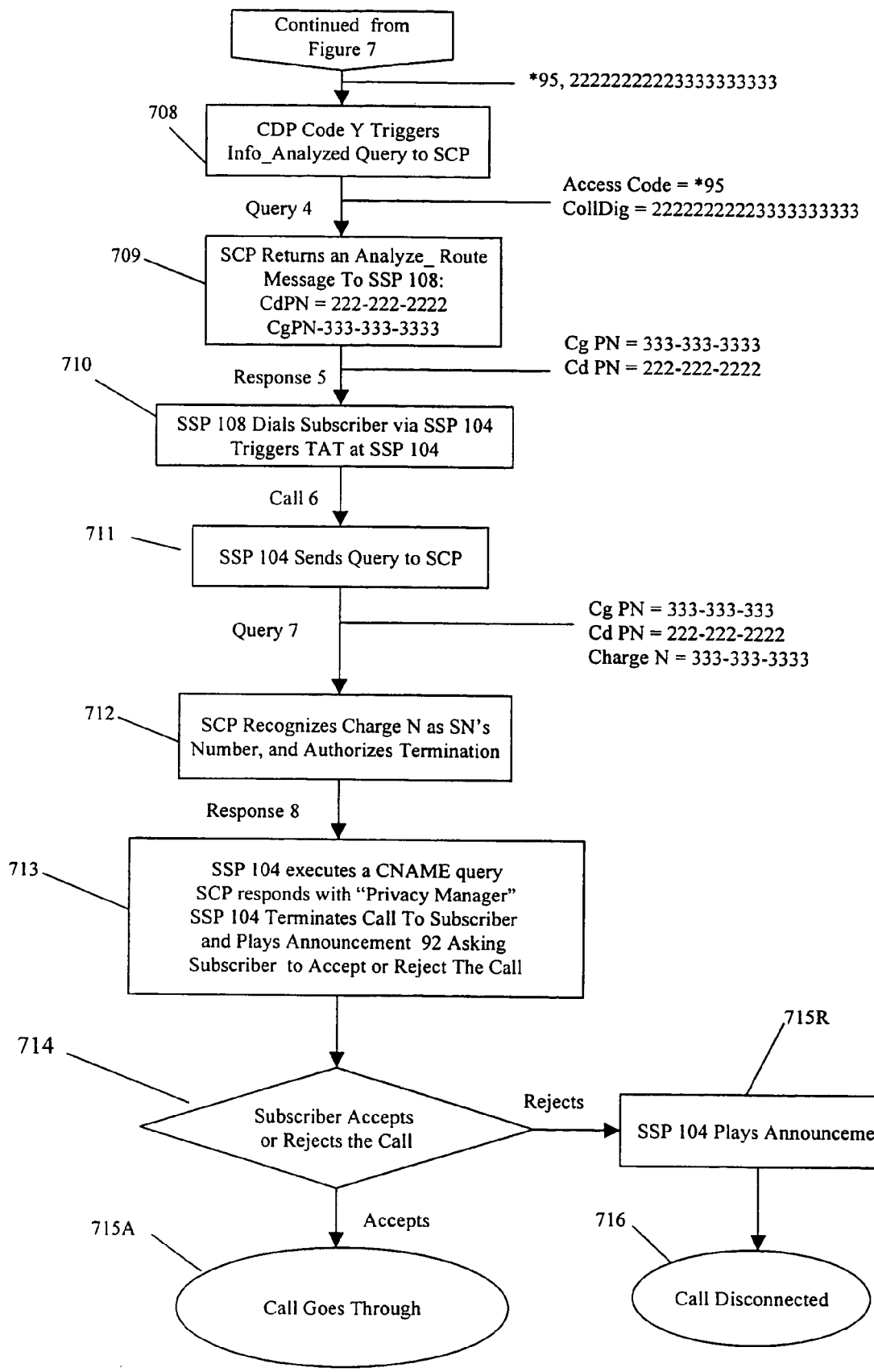

FIGS. 7–7a are charts showing the call flows to a subscriber to a privacy screening service when the calling party is unknown (e.g., because the call is coming from outside the network). In step 701, the calling party dials the subscriber's number. The call (call 1 in FIG. 3) is routed by the calling party's SSP 103 to the subscriber's SSP 104 in step 702. This call triggers a TAT at SSP 104, because the subscriber's line is provisioned with a privacy screening TAT. In step 703, SSP 104 sends the TAT query to SCP 107 (query 2 in FIG. 3). In step 704, SCP 107 checks the calling party ID and determines that the calling party is unknown. SCP 107 then responds (response 3) to query 2 by instructing SSP 104 to route the call to SN 109, with instructions to SN 109 to play an announcement to the caller. SSP 104 routes the call to SN 109 via SSP 108. The call reaches SN 109 with the SN's Multi-Line Hunt Group Number in the CdPN field, and the subscriber's number in the ReDirectID field. The calling party field is blank. In step 705, SN 109 plays an announcement, e.g., announcement 91, asking the calling party to record his or her name. The calling party agrees, e.g., by saying their name, or refuses (e.g., by hanging up) in step 706. If the calling party refuses to record his or her name, the call is disconnected in step 707R.

If the calling party records his or her name, in step 707A SN 109 dials CDP code Y, e.g., *95, followed by the subscriber's number and the lead number of SN 109's Multi-line Hunt Group. In step 708, this dialed string reaches SSP 108, and the CDP code Y triggers an info_analyzed query (query 4) from SSP 108 to SCP 107, with the "Access Code" and "Collected Digits" fields populated as follows:

Access code=Y (*95, in this example)

Collected Digits=the remainder of the digits, i.e. the 10-digit called party number (the subscriber's number), followed by the 10-digit lead number of SN 109's MLHG.

In step 709, SCP 107 analyzes the string, and returns an analyze_route message (response 5) with the subscriber's number in the CdPN field and SN 109's lead Multi-Hunt Group number in the CgPN field. SSP 108 calls the subscriber in step 710 (call 6 in FIG. 3) via SSP 104, triggering the TAT on the subscriber's line at SSP 104. In step 711, SSP 104 then sends the TAT query (query 7) to SCP 107. This query has SN 109's Multi Line Hunt Group lead number in the charge party field. In step 712, SCP 107 recognizes SN 109's number in the charge party field, and authorizes termination of the call (response 8).

In step 713, SSP 104 terminates the call to the subscriber, and plays an announcement (e.g., announcement 92) that includes playing the recording of the calling party's name. If the subscriber subscribes to caller ID deluxe, SSP 104 also executes a CNAME query to SCP 107, to which SCP 107 responds with "Privacy Manager" (or a similar name) as the calling party. In step 714, the subscriber decides whether to accept or reject the call. If the subscriber rejects the call, SSP 104 plays an announcement to the caller rejecting the call in step 715R, and the call is disconnected in step 716. If the subscriber rejects the call, optionally the subscriber may select a simple rejection or a sales call rejection, or may choose to forward the call to voicemail. If the subscriber decides to accept the call, the call goes through in step 715A.

The foregoing disclosure of embodiments of the present invention and examples of how the present invention can be carried out has been presented for purposes of illustration and description. It is not exhaustive or intended to limit the invention to the precise forms disclosed herein. Many variations and modifications of the embodiments and examples described herein will be obvious to one of ordinary skill in the art in light of the above disclosure. The scope of the invention is to be defined only by the claims appended hereto, and by their equivalents.

What we claim is:

1. A privacy management system that permits a subscriber to screen calls made to the subscriber, comprising:
    a first service switching point connected to a subscriber telephone that receives a telephone call from a calling party that is intended for the subscriber and in response to the call initiates a query to determine whether the call is from a public telephone number, a private telephone number, or an unknown telephone number;
    a second service switching point connected to a service node and the first service switching point; and
    a service control point in communication with the first and second service switching points that receives the query and responds to the query;
    wherein when the telephone call is from a public number, the telephone call is forwarded directly to the subscriber, and optionally when the telephone call is from a private number or unknown number, the telephone call is directed to the service node through the second service switching point, wherein a presentation indicator is first toggled and afterwards the service node requests from the calling party whether calling party information may be forwarded to the subscriber before forwarding the telephone call to the subscriber, and if authorized provides that information from the service control point, wherein the system is configured for preserving and delivering the calling party number from a private calling party to the subscriber.

2. The system of claim 1, wherein if the calling party denies permission, then the call is disconnected.

3. The system of claim 1, wherein if the calling party grants permission, then the call is forwarded to the subscriber with information relating to the calling party.

4. The system of claim 1, wherein the permission is granted by the calling party by pushing a number on the telephone.

5. The system of claim 1, wherein when the call is from an unknown number, the service node requests permission from the calling party to forward information relating to the calling party to the subscriber.

6. The system of claim 5, wherein if the calling party denies permission, then the call is disconnected.

7. The system of claim 5, wherein if the calling party grants permission, then the call is forwarded to the subscriber with information relating to the calling party.

8. The system of claim 5, wherein the permission is granted by the calling party by stating a name of the calling party.

9. The system of claim 8, wherein the subscriber receives information relating to the name of the calling party and decides whether to accept the call.

10. The system of claim 9, wherein when the subscriber refuses the call, the call is disconnected.

11. The system of claim 9, wherein when the subscriber accepts the call, the calling party and the subscriber are connected.

12. A privacy management system for controlling a telephone call from a calling party to a subscriber, the privacy management system comprising:
    a first service switching point connected to a subscriber telephone;
    a second service switching point connected to a service node and the first service switching point;
    means for determining whether the telephone call is from a public number, a private number, or an unknown number;
    means for forwarding the telephone call directly to the subscriber when the telephone call is determined to be from a public telephone number;
    means for directing the telephone call to the service node through the second service switching point, when the telephone call is determined to be from a private or unknown telephone number;
    means for first toggling a presentation indicator and afterwards means for requesting authorization from the calling party before forwarding the telephone call to the subscriber;
    means for preserving the calling party number; and means for providing the calling party number to the subscriber if authorized, wherein when the call is from a private number, the system is configured for preserving the calling party number and terminating the call to the subscriber.

13. The system of claim 12, wherein when the call is from a private number, the service node requests permission by a press of a button from the calling party to forward information relating to the calling party to the subscriber.

14. The system of claim 12, wherein when the call is from an unknown number, the service node requests the calling party to state a name of the calling party to be forwarded to the subscriber.

15. A method for managing privacy by controlling calls received by a subscriber, the method comprising:

receiving a call from a calling party number directed to the subscriber;

determining whether the call is from a public number, a private number, or an unknown number, and forwarding the call directly to the subscriber if the call is from a public number;

first toggling a presentation indicator and afterwards inquiring permission from the calling party to forward private number information to the subscriber if the call is from a private number, wherein, if the call is from a private number, the system preserves the calling party number for presentation to the subscriber;

requesting identification information from the calling party to forward to the subscriber if the call is from an unknown number.

16. The method of claim 15, further comprising:

forwarding the call made from a private number to the subscriber if the calling party grants permission; or forwarding the call made from an unknown number to the subscriber if the calling party provides identifying information.

* * * * *

UNITED STATES PATENT AND TRADEMARK OFFICE
CERTIFICATE OF CORRECTION

PATENT NO. : 7,136,472 B2  Page 1 of 1
APPLICATION NO. : 10/917617
DATED : November 14, 2006
INVENTOR(S) : Nicholas P. Hill et al.

It is certified that error appears in the above-identified patent and that said Letters Patent is hereby corrected as shown below:

Title Page, Should Read
(63) This application is a continuation of U.S. Application 10/402,947, filed April 1, 2003, and now issued as U.S. Patent 6,876,735 (BS99030 CON 1), which is a continuation of U.S. Application 09/372,676, filed August 12, 1999, and now issued as U.S. Patent 6,542,596.

Signed and Sealed this

Thirteenth Day of February, 2007

JON W. DUDAS
*Director of the United States Patent and Trademark Office*